United States Patent
Ambauen et al.

(10) Patent No.: US 11,518,669 B2
(45) Date of Patent: Dec. 6, 2022

(54) SANITIZING SYSTEMS AND METHODS FOR FLUID MIXTURE DISPENSING DEVICE

(71) Applicant: Cana Technology, Inc., Redwood City, CA (US)

(72) Inventors: Matthew Ambauen, San Francisco, CA (US); Gregory Allen Springer, Los Altos, CA (US); Jeffery Lance Kizer, Oakland, CA (US); Stephan Weidi Tai, San Francisco, CA (US); Erik James Shahoian, Sonoma, CA (US); David Friedberg, San Francisco, CA (US); Andrés Ornelas Vargas, San Francisco, CA (US); Simon Spence, Hawthorn (AU); Peter Delmenico, Hampton (AU); Andrew Christopher Jenkins, West Heidelberg (AU); Nathan Andrew Ray, Heathmont (AU); Elijah S. Kashi, San Francisco, CA (US); Dale Word, Chico, CA (US); Nicholas D. Posner, Redwood City, CA (US); Kristopher Bernardo Dos Santos, San Francisco, CA (US)

(73) Assignee: Cana Technology, Inc., Redwood City, CA (US)

( * ) Notice: Subject to any disclaimer, the term of this patent is extended or adjusted under 35 U.S.C. 154(b) by 0 days.

(21) Appl. No.: 17/549,155

(22) Filed: Dec. 13, 2021

(65) Prior Publication Data

US 2022/0250894 A1 Aug. 11, 2022

Related U.S. Application Data

(60) Provisional application No. 63/146,461, filed on Feb. 5, 2021.

(51) Int. Cl.
*B01F 35/10* (2022.01)
*B01F 33/84* (2022.01)
(Continued)

(52) U.S. Cl.
CPC ............ *B67D 1/0878* (2013.01); *A47J 31/40* (2013.01); *A47J 31/407* (2013.01); *A47J 31/461* (2018.08);
(Continued)

(58) Field of Classification Search
CPC ................ B67D 1/07; B67D 2001/075; B67D 1/0015–004
See application file for complete search history.

(56) References Cited

U.S. PATENT DOCUMENTS 3,991,911 A * 11/1976 Shannon ............... G07F 13/065
222/25
4,848,381 A 7/1989 Livingston et al.
(Continued)

FOREIGN PATENT DOCUMENTS

DE 102006047969 A1 4/2008
DE 102008003733 A1 7/2009
(Continued)

OTHER PUBLICATIONS

International Search Report dated Apr. 20, 2022 from International Application No. PCT/US2022/012106 filed Jan. 12, 2022, 16 pages.
(Continued)

*Primary Examiner* — Jason K Niesz
(74) *Attorney, Agent, or Firm* — Daylight Law, P.C.

(57) ABSTRACT

Systems and methods for sanitizing a fluid mixture dispensing system are disclosed. One system comprises at least one reservoir for storing a substance, a mixing area, and a controller. The controller is programmed to cause the system to execute a mixing cycle and a cleaning cycle. During the
(Continued)

mixing cycle the substance is dispensed from the at least one reservoir to the mixing area to prepare an ingestible fluid mixture. During the cleaning cycle, the substance is dispensed from the at least one reservoir to the mixing area to sanitize the mixing area.

17 Claims, 5 Drawing Sheets

(51) Int. Cl.
| | |
|---|---|
| B67D 1/08 | (2006.01) |
| B67D 1/00 | (2006.01) |
| A47J 31/52 | (2006.01) |
| F16K 37/00 | (2006.01) |
| A47J 31/40 | (2006.01) |
| A47J 31/46 | (2006.01) |
| B67D 1/12 | (2006.01) |
| B67D 1/14 | (2006.01) |
| B08B 9/032 | (2006.01) |
| B67D 1/04 | (2006.01) |
| B67D 1/07 | (2006.01) |
| B01F 35/71 | (2022.01) |
| B67D 3/00 | (2006.01) |
| B01F 35/75 | (2022.01) |
| B01F 35/221 | (2022.01) |
| B01F 35/21 | (2022.01) |
| B01F 101/16 | (2022.01) |
| A23G 9/30 | (2006.01) |
| B01F 23/40 | (2022.01) |
| B01F 101/21 | (2022.01) |
| B01F 101/14 | (2022.01) |
| B01F 35/30 | (2022.01) |

(52) U.S. Cl.
CPC ......... *A47J 31/5251* (2018.08); *B01F 33/846* (2022.01); *B01F 35/1453* (2022.01); *B01F 35/2113* (2022.01); *B01F 35/2213* (2022.01); *B01F 35/7174* (2022.01); *B01F 35/71745* (2022.01); *B01F 35/71805* (2022.01); *B01F 35/718051* (2022.01); *B01F 35/7543* (2022.01); *B08B 9/032* (2013.01); *B67D 1/0015* (2013.01); *B67D 1/0019* (2013.01); *B67D 1/0037* (2013.01); *B67D 1/0046* (2013.01); *B67D 1/0052* (2013.01); *B67D 1/0078* (2013.01); *B67D 1/0085* (2013.01); *B67D 1/04* (2013.01); *B67D 1/07* (2013.01); *B67D 1/0884* (2013.01); *B67D 1/0885* (2013.01); *B67D 1/0888* (2013.01); *B67D 1/1252* (2013.01); *B67D 1/14* (2013.01); *B67D 3/0012* (2013.01); *B67D 3/0019* (2013.01); *B67D 3/0041* (2013.01); *F16K 37/0041* (2013.01); *A23G 9/30* (2013.01); *B01F 23/483* (2022.01); *B01F 2035/351* (2022.01); *B01F 2101/14* (2022.01); *B01F 2101/16* (2022.01); *B01F 2101/21* (2022.01); *B67D 2001/0093* (2013.01); *B67D 2001/0098* (2013.01); *B67D 2001/0481* (2013.01); *B67D 2001/075* (2013.01); *B67D 2210/00013* (2013.01); *B67D 2210/00065* (2013.01); *B67D 2210/00089* (2013.01); *B67D 2210/00091* (2013.01); *B67D 2210/00146* (2013.01)

(56) References Cited

U.S. PATENT DOCUMENTS

| | | | |
|---|---|---|---|
| 5,348,058 | A * | 9/1994 | Ruhl ................... B67C 3/001 |
| | | | 141/90 |
| 6,625,993 | B2 | 9/2003 | Frank et al. |
| 7,993,468 | B2 | 8/2011 | Staten |
| 9,284,174 | B2 | 3/2016 | Springer |
| 2010/0145522 | A1 | 6/2010 | Claesson et al. |
| 2012/0100275 | A1 | 4/2012 | Bishop et al. |
| 2014/0312071 | A1 | 10/2014 | Chase et al. |
| 2016/0037963 | A1* | 2/2016 | Tuchrelo ................ B08B 3/08 |
| | | | 222/148 |
| 2016/0176693 | A1* | 6/2016 | Lawler ................ B67D 1/1277 |
| | | | 222/148 |
| 2016/0280527 | A1* | 9/2016 | Griscik ................ B67D 1/0872 |
| 2018/0049582 | A1* | 2/2018 | Rehfuss ................ B67D 1/0037 |
| 2018/0312386 | A1 | 11/2018 | Brun-Kestler et al. |
| 2019/0053658 | A1* | 2/2019 | Lecomte ............. B67D 3/0087 |
| 2019/0070643 | A1* | 3/2019 | Wong ................... B08B 9/0321 |
| 2019/0352164 | A1* | 11/2019 | Katz .................... B08B 9/0325 |

FOREIGN PATENT DOCUMENTS

| | | |
|---|---|---|
| EP | 1894501 A2 | 3/2008 |
| GB | 2496874 A | 5/2013 |
| JP | H10302141 A | 11/1998 |
| KR | 101098135 B1 | 12/2011 |

OTHER PUBLICATIONS

International Search Report dated Jun. 14, 2022 from International Application No. PCT/US2022/012106, 20 pages.

* cited by examiner

SANITIZING SYSTEMS AND METHODS FOR FLUID MIXTURE DISPENSING DEVICE

CROSS REFERENCE TO RELATED APPLICATIONS

This application claims the benefit of U.S. Provisional Patent Application No. 63/146,461 filed Feb. 5, 2021, which is incorporated by reference herein in its entirety for all purposes.

BACKGROUND

Typical beverage dispensing systems combine a diluent (e.g., water) with a basic beverage component. In an ideal case, the dilutants and components are provided to the device in a sterile state and all the surfaces of the system which interact with the dilutants and components within the machine are sanitized. However, over time, the various fluid channels and surfaces of the device will accumulate detritus from prior beverages which pose a risk of reducing the performance of the device, degrading the quality of beverages generated by the device, and increasing the risk of unsanitary conditions such as microbial growth within the device.

SUMMARY

This disclosure relates generally to fluid mixture dispensing systems and methods, and more specifically, to sanitizing systems and methods for fluid mixture dispensing systems. As used herein, the term sanitize refers to the action of reducing or eliminating pathogenic agents while the term "clean" is a broader term which includes the use of a sterile solvent for the removal of accumulate detritus.

Fluid mixture dispensing can be accomplished by an automated fluid mixture dispensing system. Such systems can generate mixtures of beverages, cleaning products, cosmetic compounds, and various other fluid mixtures. Based on a user selection that is custom tailored by them, the system can prepare and dispense a variety of fluid mixtures, based on a set of basic mixtures and compounds. The system can rely on the predefined chemical makeup of the fluid mixture for the system to prepare the mixture. For example, chemical analysis of a specific wine or perfume results in a list of chemical ingredients or components that make up the specific wine or perfume. The systems disclosed herein can rely on that predetermined list of chemical ingredients for a specific final, user specified fluid mixture (e.g., chardonnay) to prepare that fluid mixture. Some chemical ingredients may be dispensed in the final mixture with relatively large volume percentages (e.g., a glass of wine may have about 10-15% ethanol), whereas other components may be dispensed in volume of less than 0.1 mL. Because a small quantity (e.g., less than 0.1 mL) of an individual chemical ingredient can have a large effect on a fluid mixture property (e.g., taste), the overall storage or footprint of the system can be significantly smaller than those dispensing systems which rely on syrups and/or concentrates.

FIG. 1 illustrates an example of a fluid mixture dispensing system in the form of a device 100, in accordance with specific embodiments of the invention. Image 150 illustrates an example of the external appearance of the device 100 and image 160 illustrates an example of some of the internal components that can be part of the device 100. In some embodiments, the fluid mixture dispensing device 100 can be used for beverage dispensing as well as a wide variety of other fluid mixture dispensing. The fluid mixture dispensing device 100 can include a cup area for a cup 104. The fluid mixture dispensing device 100 can be a countertop or consumer electronic device or a larger device installed in a restaurant or other commercial business.

Fluid mixture dispensing device 100 can include a casing 102. The casing can be a protective outer casing that houses various internal components of the system, such as the components illustrated in image 160. These internal components can include solvent reservoir(s) (e.g., water reservoir(s) and/or alcohol reservoir(s)) such as solvent reservoirs 108a and 108b, ingredient reservoirs such as ingredient reservoirs 106, a cartridge for the ingredient reservoirs, such as cartridge 105, mixing channels, mixing chambers, heat exchangers (e.g., heaters/chillers), and/or dissolution chamber(s) as well as various fluid moving mechanisms (e.g., valves, actuators, pumps, etc.). Fluid mixture dispensing system 100 can also include a user interface 103 so that a user can control the device. For example, a user can select a beverage to be made by device 100 via the user interface 103. Fluid mixture dispensing system 100 can also include one or more controllers configured to execute instructions to control the various components of the device and to cause the device to perform the functions described in this disclosure.

In specific embodiments of the invention, the fluid mixture dispensing system is configured to perform one or more cleaning cycles. The cleaning cycles can include the use of one or more substances stored in the device, such as a solvent from solvent reservoirs 108a/108b and/or an ingredient from one or more ingredient reservoirs such as ingredient reservoir 106. The substance can be used as an ingredient for preparing a fluid mixture (for example a beverage to be ingested by a user of the device), and as a cleaning fluid or an ingredient for the preparation of a cleaning fluid. In specific embodiments of the invention, the system can include various cleaning modes.

In specific embodiments of the invention, a fluid mixture dispensing system is provided. The system comprises at least one reservoir for storing a substance, a mixing area, and a controller. The controller is programmed to cause the fluid mixture dispensing system to: dispense, during a mixing cycle, the substance from the at least one reservoir to the mixing area to prepare an ingestible fluid mixture; and dispense, during a cleaning cycle, the substance from the at least one reservoir to the mixing area to sanitize the mixing area.

In specific embodiments of the invention, a method for a fluid mixture dispensing system is provided. The method comprises dispensing, during a mixing cycle, a substance from at least one reservoir to a mixing area to prepare an ingestible fluid mixture. The method also comprises dispensing, during a cleaning cycle, the substance from the at least one reservoir to the mixing area to sanitize the mixing area.

In specific embodiments of the invention, a fluid mixture dispensing system is provided. The system comprises at least one solvent reservoir, at least one ingredient reservoir, a mixing area, and a controller. The controller programmed is to cause the fluid mixture dispensing system to: mix, in the mixing area, a solvent from the at least one solvent reservoir and an ingredient from the at least one ingredient reservoir to create an ingestible fluid mixture; and generate, in the mixing area, a cleaning product using the solvent from the at least one solvent reservoir and ingredient from the at least one ingredient reservoir.

BRIEF DESCRIPTION OF THE DRAWINGS

In the Figures, like reference numbers correspond to like components unless otherwise stated.

DETAILED DESCRIPTION

Figure 1:
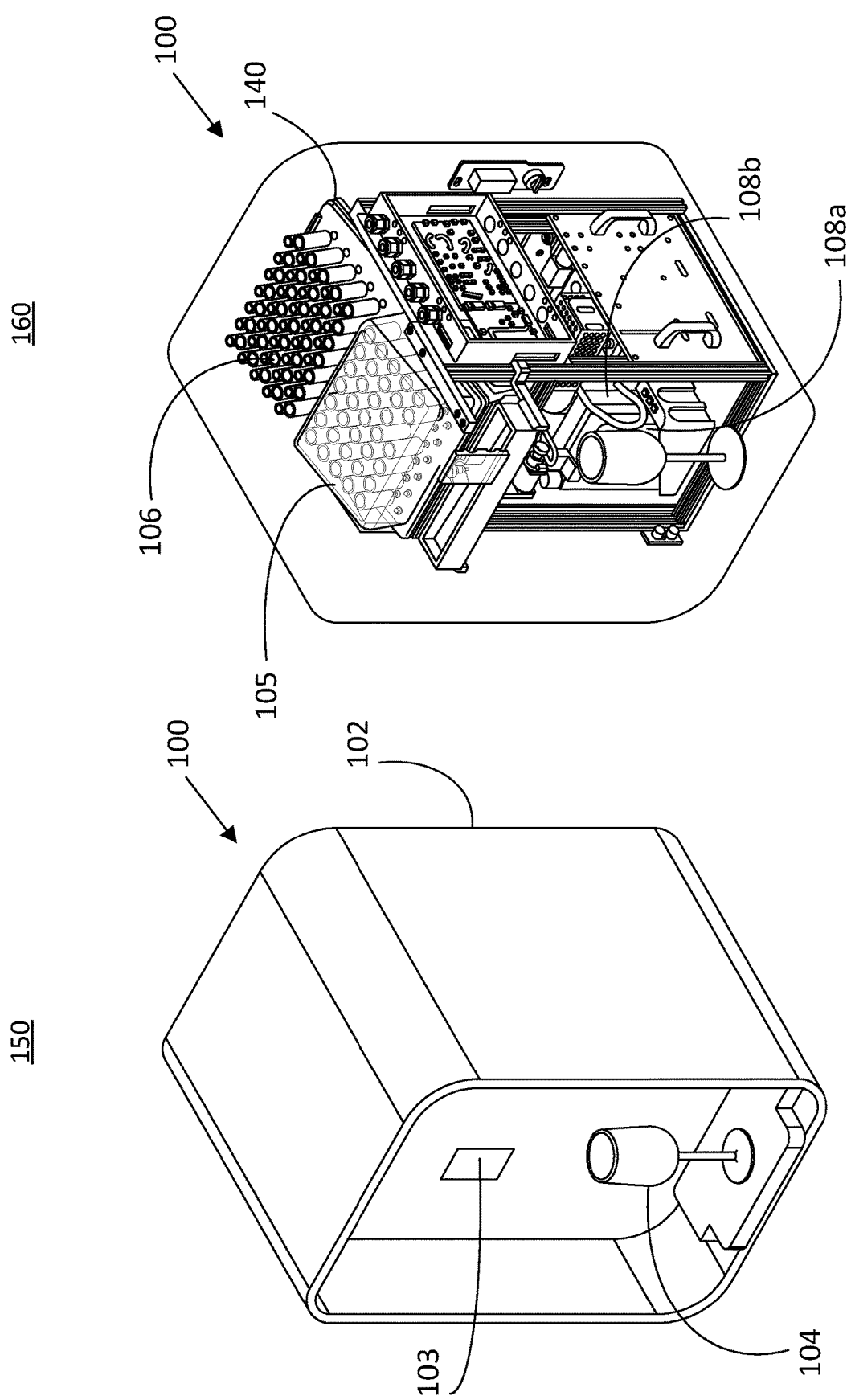
FIG. 1 illustrates an example of a fluid mixture dispensing system, in accordance with specific embodiments disclosed herein.

Reference will now be made in detail to implementations and embodiments of various aspects and variations of systems and methods described herein. Although several exemplary variations of the systems and methods are described herein, other variations of the systems and methods may include aspects of the systems and methods described herein combined in any suitable manner having combinations of all or some of the aspects described.

Different components and methods for a fluid mixture dispensing system such as device 100 illustrated in FIG. 1 will be described in detail in this disclosure. The methods and systems disclosed in this section are nonlimiting embodiments of the invention, are provided for explanatory purposes only, and should not be used to constrict the full scope of the invention. It is to be understood that the disclosed embodiments may or may not overlap with each other. Thus, part of one embodiment, or specific embodiments thereof, may or may not fall within the ambit of another, or specific embodiments thereof, and vice versa. Different embodiments from different aspects may be combined or practiced separately. Many different combinations and sub-combinations of the representative embodiments shown within the broad framework of this invention, that may be apparent to those skilled in the art but not explicitly shown or described, should not be construed as precluded.

As illustrated with reference to FIG. 1, the fluid mixture dispensing device 100 can include one or more ingredient reservoirs, such as ingredient reservoir 106. The ingredient reservoirs can be any of the ingredient reservoirs described in U.S. Provisional Patent Application No. 63/146,461 filed Feb. 5, 2021, U.S. patent application Ser. No. 17/547,081 filed Dec. 9, 2021, and U.S. patent application Ser. No. 17/545,699 filed Dec. 8, 2021, all of which are incorporated by reference herein in their entirety for all purposes.

An ingredient reservoir can include an "ingredient" also referred to herein as an "ingredient mixture". An ingredient mixture can include at least one primary/functional ingredient. A primary/functional ingredient can be at least one of a solid, liquid, or a gas. An example of a primary/functional ingredient can be chemical compounds.

In some embodiments, the ingredient mixture can include various concentrations of chemical compounds. In some embodiments, an ingredient mixture can include at least one solvent. The at least one solvent can be any combination of solvents disclosed herein. For example, an ingredient mixture in an ingredient reservoir can be a mixture of citric acid (primary/functional ingredient) and water at a particular concentration. Another ingredient mixture can be a mixture of potassium sulfate (primary/functional ingredient), water, and ethanol. As discussed herein, these ingredients/ingredient mixtures can get dispensed into a fluid stream (which could be a mixture in itself of solvent (e.g., water and/or ethanol)) and combined together to form an intermediate fluid mixture. In some embodiments, an ingredient mixture can also include at least one of a solvent (e.g., water and/or an alcohol) and an additive ingredient. An additive ingredient can be at least one of a surfactant, preservative, or an emulsifier/stabilizer.

Ingredient or ingredient mixtures can be stored in ingredient reservoirs, such as ingredient reservoir 106. In some embodiments, the ingredient reservoirs can include bladder bags, syringes, gravity dispense chambers, pellet dispenser, and/or pierceable volumes. In some embodiments, the ingredient reservoirs can be the same, vary, or a combination thereof in the system. In some embodiments, the fluid mixture dispensing system can include a plurality of ingredient reservoirs.

In some embodiments, in response to receiving a request for a fluid mixture, the system can flow a predetermined amount of at least one ingredient from a plurality of ingredient reservoirs to at least one mixing channel to form an intermediate fluid mixture. The device can include multiple mixing channels. The term mixing area will be used in this disclosure to refer to any area in which an intermediate fluid mixture of one or more substances (including ingredients and/or solvents) is formed including, for example one or more mixing channels in which one or more ingredients are mixed with each other and/or with one or more solvents. The predetermined amount of the at least one ingredient can be mixed with at least one solvent (e.g., water from a water reservoir and/or alcohol from an alcohol reservoir) in the at least one mixing channel before flowing to the mixing chamber. The at least one solvent can dissolve the at least one ingredient and/or carry the at least one ingredient to the mixing chamber.

In some embodiments, in response to receiving a request for a fluid mixture, the system can flow a predetermined amount of at least one ingredient from at least one ingredient reservoir to other parts of the system, such as the mixing chamber, or to at least one dissolution chamber to form an intermediate mixture. In some embodiments, the at least one ingredient reservoir that is configured to flow an ingredient directly to the mixing chamber 207 and/or dissolution chambers may not be one of the ingredient reservoirs that is fluidly connected to the at least one mixing channel.

In some embodiments, the predetermined amount(s) of the ingredient(s) can be specific to the requested fluid mixture. In other words, the predetermined amount(s) of the ingredient(s) that is(are) flowed to the mixing chamber whether it be flowed directly there or in an intermediate mixture or mixtures from a mixing area can correspond to the amount(s) of the ingredient(s) in a predefined fluid mixture, for example a fluid mixture selected form a library of predefined fluid mixtures.

In some embodiments, a predetermined amount of an ingredient from an ingredient reservoir can be dispensed via at least one microfluidic pump into a mixing area including at least one mixing channel, or into the mixing chamber, and/or at least one dissolution chamber. In some embodiments, every ingredient reservoir can be fluidly connected to a microfluidic pump for dispensing an ingredient in an ingredient reservoir to a mixing channel, the mixing chamber, and/or at least one dissolution chamber. In some embodiments, multiple ingredient reservoirs can be fluidly connected to a microfluidic pump for dispensing ingredients from the ingredient reservoirs.

The ingredient reservoirs can be provided in one or more cartridges, such as cartridge 105. The cartridge can include a pressurized chamber to keep the ingredient reservoirs under pressure and facilitate dispense of such ingredients. The cartridge can be any of the cartridges described in U.S. Provisional Patent Application No. 63/146,461 filed Feb. 5, 2021, U.S. patent application Ser. No. 17/547,081 filed Dec. 9, 2021, U.S. patent application Ser. No. 17/547,612 filed Dec. 10, 2021, and U.S. patent application Ser. No. 17/545,699 filed Dec. 8, 2021, all of which are incorporated by reference herein in their entirety for all purposes.

FIG. 1 shows a set of ingredient reservoirs, such as ingredient reservoirs 106, packaged in an ingredient cartridge 105. In some embodiments, the system can include one or more ingredient cartridges. For example, at least one of 0-N solid ingredient cartridges, 0-N gaseous ingredient cartridges, 0-N multi-ingredient cartridges, and 0-N liquid ingredient cartridges. In some embodiments, an ingredient cartridge 105 can include a plurality of ingredient reservoirs 106.

In some embodiments, at least one cartridge can be configured to dispense a predetermined amount of the at least one ingredient from at least one ingredient reservoir to a mixing area (including one or more mixing channels), the mixing chamber, and/or at least one dissolution chamber. In some embodiments, the at least one cartridge can be removably attached from the fluid mixture dispensing system so that it can be replaced, serviced (ingredients refilled/replaced) and recyclable. In some embodiments, the fluid mixture dispensing system can still operate with a cartridge missing or empty.

In some embodiments, a predetermined amount of at least one ingredient can be dispensed via at least one valve into the mixing area, the mixing chamber, and/or at least one dissolution chamber. In some embodiments, each ingredient reservoir can have an individual valve and actuator. In some other embodiments, more than one ingredient reservoir can be associated to the same valve and/or actuator. In some embodiments, each valve can be configured to control the flow of an ingredient from an ingredient reservoir to the mixing area, the mixing chamber, and/or at least one dissolution chamber.

In some embodiments, the at least one cartridge, such as cartridge 105, can include a pressurized chamber inside the cartridge. In specific embodiments, the pressurized chamber can be formed by the cartridge itself. This pressurized chamber can house the plurality of ingredient reservoirs, such as ingredient reservoir 106, such that a pressure can be applied to the ingredient reservoirs. In some embodiments, the system (e.g., a controller, a pneumatic system) can be configured to control the pressure of the pressurized chamber. Accordingly, the cartridge can be pressurized such that when the valve of an ingredient reservoir is opened, the ingredient stored in that ingredient reservoir can flow out of the ingredient reservoir towards a mixing channel, the mixing chamber, and/or at least one dissolution chamber. The ingredient reservoirs can be loaded into or attached to the pressurized chamber with a controlled pressure for providing an expulsion force.

The mixing area (including one or more mixing channels), the mixing chamber, and/or at least one dissolution chamber can be fluidly connected to the valve outputs of the ingredient reservoirs such that any valve opening can result in an ingredient flowing to a mixing area (including one or more mixing channels), the mixing chamber, and/or at least one dissolution chamber. In some embodiments, the controller can be configured to open at least one valve for a time based on at least the pressure of the pressurized chamber, the physical flow characteristics of the specific ingredient in the ingredient reservoir, and/or the diameter of the at least one valve opening to control the flow of the predetermined amount of the at least one ingredient to be dispensed. Accordingly, for a specific ingredient in an ingredient reservoir, the system can be calibrated to dispense/flow a predetermined amount of the specific ingredient to a mixing area (including one or more mixing channels), the mixing chamber, and/or at least one dissolution chamber based on the pressure of the pressurized chamber, the physical flow characteristics (e.g., viscosity) of the specific ingredient in the ingredient reservoir, and/or the diameter of the valve opening (or diameter of an orifice of the ingredient reservoir). As such, the time interval that the at least one valve is open can proportionally correspond to amounts/concentrations of at least one ingredient of a list of ingredients of a predefined fluid mixture (from a chemical analysis). Dispensing an expected amount of an ingredient, as controlled by the time the valve is open, using the approaches disclosed in this paragraph is referred to in this disclosure as a time-based ingredient dispensing method.

In some embodiments, the ingredients stored in the ingredient reservoirs can be ported to valves beneath the ingredient reservoir. In some embodiments, the ingredient reservoirs (and their valves) can open to a mixing area. In some embodiments, a plurality of ingredient reservoirs can be fluidly connected to a mixing area including a single mixing channel. In some embodiments, a mixing channel can be fluidly connected to a plurality of mixing channels and a second mixing channel can be fluidly connected to a second plurality of mixing channels. For example, a first mixing channel may have 5-20 ingredient reservoirs fluidly connected to it and a second mixing channel may have 5-20 of the same or different ingredient reservoirs fluidly connected to the second mixing channel. In those embodiments, the mixing area can include the plurality of mixing channels. Accordingly, at least one solvent (e.g., water and/or ethanol) can flow through the mixing area and collect any ingredient dispensed into the mixing channels. In some embodiments, at least one solvent can also be dispensed into the mixing area in order to remove any leftover ingredients, as will be explained below in more detail.

In some embodiments, the mixing channel(s) can be formed into the bottom of a plate 140. All the mixing channels can be fluidly connected to the solvent reservoir(s) and the mixing chamber. As such, solvent can enter at least one mixing channel and at least one ingredient from at least one mixing reservoir can flow into the mixing channel to form an intermediate mixture with the solvent.

In specific embodiments of the invention, the solvents used can be water, alcohol, ethyl lactate, and/or propylene glycol. At least one solvent reservoir can supply at least one solvent to the fluid mixture to be dispensed. For example, at least one solvent reservoir 108a is shown in FIG. 1 and can be, for example, a water reservoir. In some embodiments, the fluid mixture dispensing system can include a plurality of solvent reservoirs (e.g., one or multiple water reservoirs, one or multiple alcohol reservoirs, one or multiple propylene glycol reservoirs, one or multiple ethyl lactate reservoirs, and/or mix of alcohol and water reservoirs, among other variations). In some embodiments, any water reservoir(s) can include a water filter such that the water filter can remove impurities from the water in the water reservoir(s) prior to flowing the water to the other parts of the system (e.g., mixing chamber).

The at least one solvent reservoir can supply solvent to the fluid mixture to be dispensed. For example, any water reservoir can supply water to the fluid mixture to be dispensed. In some embodiments, a solvent reservoir is a solvent container housed within the fluid mixture dispensing system to supply solvent(s) to the system. The solvent(s) can be used to dissolve or carry various other ingredients to form the requested fluid mixture. In some embodiments, in response to receiving the request for a fluid mixture, the system (e.g., a controller of the system) can flow a predetermined amount of at least one solvent from at least one solvent reservoir to at least one mixing channel to form an intermediate fluid mixture.

In some embodiments, a water reservoir is a water container housed within the fluid mixture dispensing system. In other embodiments, the water reservoir may be a standard water outlet such as a faucet or water line that can be connected to the fluid mixture dispensing system to supply water to the system. In addition, water can be used as a solvent to dissolve various other ingredients to form the requested fluid mixture. In some embodiments, in response to receiving the request for a fluid mixture, the system (e.g., a controller of the system) can flow a predetermined amount of water from a water reservoir to at least one mixing channel to form an intermediate fluid mixture. The predetermined amount of water can be mixed with alcohol from an alcohol reservoir and/or ingredients (i.e., ingredient mixtures) from a plurality of ingredient reservoirs in the at least one mixing channel to form an intermediate mixture before flowing to the mixing chamber.

Figure 2:
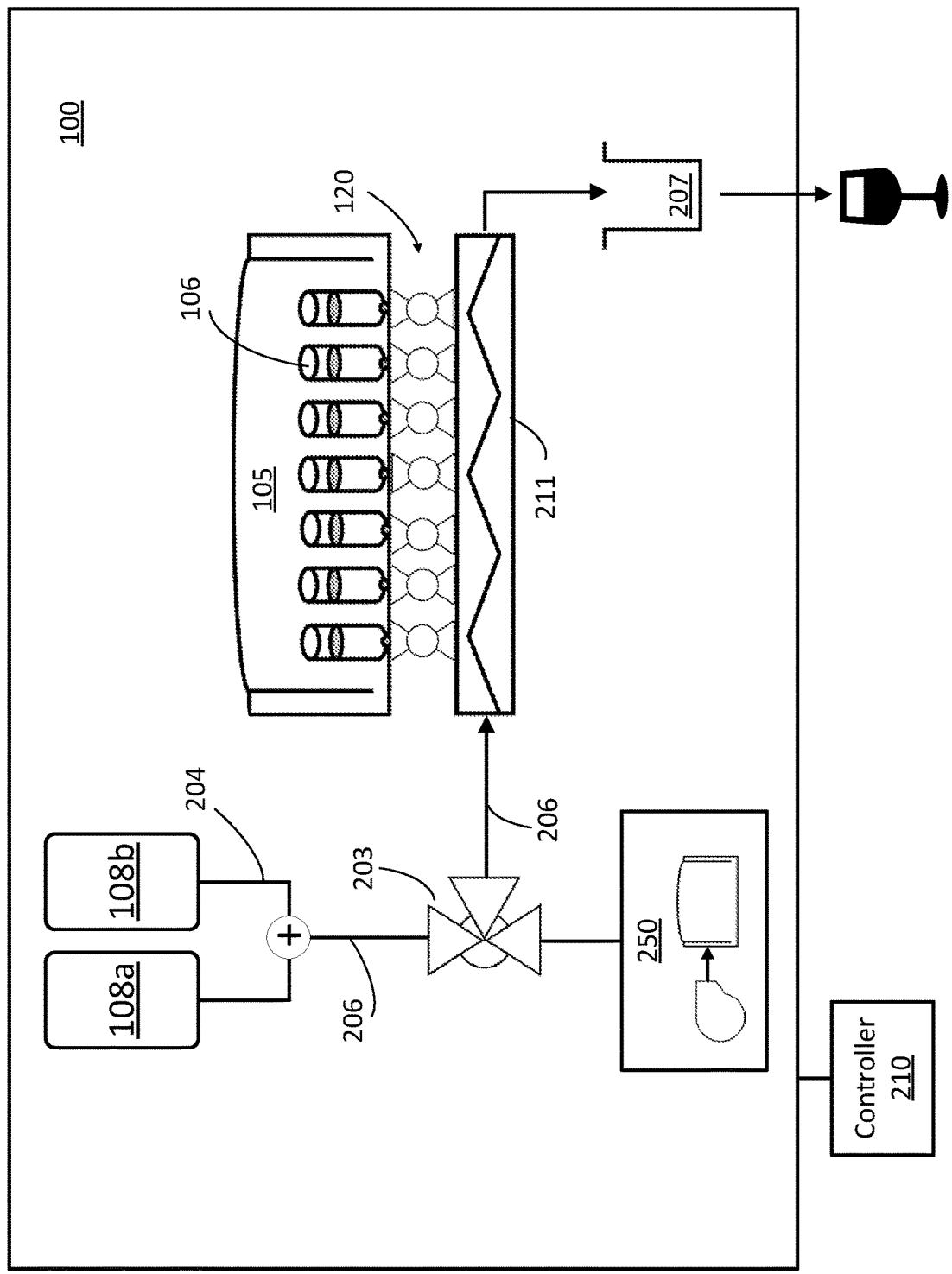
FIG. 2 illustrates a block diagram including exemplary components of a fluid mixture dispensing device in accordance with specific embodiments disclosed herein.

As illustrated in FIG. 2, in some embodiments, in response to receiving a request for a fluid mixture, the system can flow a predetermined amount of at least one solvent from at least one solvent reservoir to other parts of the system such as the mixing chamber. As such, the mixing chamber can be fluidly connected to a water reservoir.

The predetermined amount of the at least one solvent can be specific to the requested fluid mixture. In other words, the predetermined amounts of solvent(s) that is flowed to the mixing chamber whether it/they be directly flowed there or in an intermediate mixture or intermediate mixtures can correspond to the amount of solvent(s) in the predefined fluid mixture selected form the library of a predefined fluid mixtures. In some embodiments, the predetermined amounts of the at least one solvent can be flowed from the at least one solvent reservoir throughout the system via at least one pump.

In some embodiments, the fluid mixture dispensing system can include more than one solvent reservoir, for example a second solvent reservoir such as second solvent reservoir 108b illustrated in FIG. 1. The second solvent reservoir can be for the same or different solvent as the first solvent reservoir. In specific embodiments of the invention, the second solvent reservoir, such as 108b, can be an alcohol reservoir as illustrated in FIG. 2. In some embodiments, the fluid mixture dispensing system can include a plurality of alcohol reservoirs. The alcohol reservoir can supply alcohol to the fluid mixture to be dispensed. As stated above, the solvent reservoirs can include alcohol (e.g., ethanol), water, ethyl lactate, propylene glycol, and/or a wide variety of other alcohols and/or solvents and their various combinations. Alcohol in the alcohol reservoir can actually be an alcohol mixture. In some embodiments, the alcohol mixture can include the alcohol and water. For example, an alcohol can be an alcohol mixture of 10-100% alcohol by volume (0-90% water by volume).

In some embodiments, an alcohol reservoir(s) is an alcohol container(s) housed within the fluid mixture dispensing system. Besides supplying the alcohol to a fluid mixture, alcohol can also be used to dissolve various other ingredients to form an intermediate fluid mixture as part of the requested fluid mixture. Alcohol can also be used as a sanitizing agent for the system.

In some embodiments, in response to receiving the request for a fluid mixture, the system (e.g., a controller of the system) can flow a predetermined amount of alcohol from an alcohol reservoir to at least one mixing channel to form an intermediate fluid mixture. The predetermined amount of alcohol can be mixed with water from a water reservoir and/or ingredients form a plurality of ingredient reservoirs in the at least one mixing channel to form an intermediate mixture before flowing to the mixing chamber. In some embodiments, the water and alcohol can be mixed prior to entering the at least one mixing channel.

In some embodiments, in response to receiving a request for a fluid mixture, the system can flow a predetermined amount of alcohol from an alcohol reservoir to other parts of the system such as the mixing chamber and/or a dissolution chamber. As such, the mixing chamber can be fluidly connected to an alcohol reservoir and the alcohol reservoir can be fluidly connected to the at least one dissolution chamber which in turn can be fluidly connected to the mixing chamber.

The predetermined amounts of alcohol can be specific to the requested fluid mixture. In other words, the predetermined amounts of alcohol that is flowed to the mixing chamber whether it be directly flowed there or in an intermediate mixture or mixtures can correspond to the amount of alcohol in the predefined fluid mixture selected from the library of predefined fluid mixtures. For example, if a glass of Chardonnay is selected and the predefined formula for Chardonnay has 14% alcohol by volume (ABV), the system would flow predetermined amounts of ethanol to the mixing chamber to be incorporated such that the Chardonnay has 14% ABV in the final dispensed fluid mixture based on the volume of the other ingredients. In some embodiments, the predetermined amounts of alcohol can be flowed from an alcohol reservoir throughout the system via at least one pump. In some embodiments, the system (e.g., the controller) can be configured to monitor an amount of alcohol or other solvent and/or ingredients in an alcohol, solvent and/or ingredient reservoir.

FIG. 2 illustrates a block diagram including exemplary components of a fluid mixture dispensing device, such as device 100 in accordance with specific embodiments disclosed herein. FIG. 2 includes a schematic representation of the ingredient cartridge 105 comprising a plurality of ingredient reservoirs 106. The ingredients from the ingredient reservoirs 106 can be dispensed to a mixing area 211 via a set of valves 120. The mixing area 211 can include one or more mixing channels. Each ingredient reservoir can be connected, for example via a respective valve in the set of valves 120, to one or more mixing channels in the mixing area.

FIG. 2 also includes a schematic representation of a set of solvent reservoirs, including solvent reservoirs 108a and 108b. The solvents from solvent reservoirs 108a and 108b can be dispensed to the mixing area 211 via one or more valves, such as valve 203. As illustrated, multiple solvent lines, such as solvent line 204, can form a path from the solvent reservoirs to the mixing area. In specific embodiments of the invention, two or more solvent lines can be mixed in a mixed solvent line, such as mixed solvent line 206, and provided to the mixing area 211. In specific embodiments of the invention, the solvent lines are also part of the mixing area.

FIG. 2 also includes a schematic representation of a pneumatic system 250 of the device. The pneumatic system can be any of the pneumatic systems disclosed in U.S. Provisional Patent Application No. 63/146,461 filed Feb. 5, 2021, and U.S. patent application Ser. No. 17/548,258 filed Dec. 10, 2021, both of which are incorporated by reference herein in their entirety for all purposes. The pneumatic system can be configured to force air into the mixing area for various purposes. The pneumatic system can be configured to force air to the mixing area via one or more valves, such as valve 203.

The mixing area 211 can include one or more inlet lines, such as inlet line 206. The mixing area can receive, via the inlet lines, the solvent(s) from the solvent reservoirs 108a and 108b and/or the forced air from the pneumatic system 250. In specific embodiments of the invention, the inlet lines are also part of the mixing area.

A controller, such as controller 210, can be configured to control the operation of the one or more components of the system to perform various tasks. In specific embodiments of the invention, the controller can be programmed to control the system to execute a mixing cycle. A mixing cycle can be to prepare a fluid mixture, in the manner disclosed before in this disclosure. During a mixing cycle, a fluid mixture can be automatically prepared and dispensed out the device 100. The fluid mixture can be an ingestible fluid mixture, such as a beverage to be consumed by a user of the device. The fluid mixture can include one or more substances.

In specific embodiments of the invention, the one or more substances can flow to the mixing area 211 to form an intermediate mixture that can then be moved to the mixing chamber 207 of the device, where the intermediate mixture can be further mixed with other substances or dispensed out of the device 100. In specific embodiments of the invention, the fluid mixture can be automatically dispensed out of the mixing chamber 207 when the mixing cycle is complete.

The one or more substances can include one or more ingredients from ingredient reservoirs such as ingredient reservoir 106, such as a salt, acid (e.g. a food graded acid that can be used for ingestible fluid mixtures), etc. The ingredients can flow through the valves, such as valve 120, to one or more channels in the mixing area 211. The one or more substance can include one or more solvents from solvent reservoirs, such as solvent reservoirs 108a and/or 108b. The solvent(s) can flow to the mixing area 211 via one or more channels, such as one or more solvent lines 204, 206, and inlet line 206. In specific embodiments of the invention, the solvent(s) can flow though one or more channels in the mixing area 211 and collect and/or be mixed with any ingredient that have been dispensed to such channels. In specific embodiments of the invention, the solvent enters one or more mixing channels in the mixing area, and the ingredients are dispensed into the solvent in the mixing area. In any case, the ingredients from ingredient reservoirs 106 can be mixed with each other and/or with the solvent(s) in the mixing area and form an intermediate mixture. The intermediate mixture can be dispensed out of the mixing area 211 and to a mixing chamber 207 of the device.

The one or more substances (i.e., ingredient(s) from ingredient reservoirs and/or solvent(s) from solvent reservoirs) can be dispensed from their respective reservoirs into the mixing area in various ways. In specific embodiments of the invention, the ingredients from ingredient reservoirs 106 can be in a pressurized chamber inside the cartridge 105 and flow to the mixing area 211 when the valves, such as valve 120, are open. In specific embodiments of the invention, the solvents from solvent reservoirs 108a/b can flow to the mixing area, for example with the aid of solvent pumps connected to solvent lines 204, through one or more valves 203.

Once the one or more substance has been dispensed into the mixing area, the substance or intermediate mixture can be moved through the mixing area. The intermediate mixture can be moved through the mixing area for mixing the mixture and/or for dispensing the mixture out of the mixing area and to a mixing chamber, such as mixing chamber 207. This can include agitating the intermediate mixture in the mixing area before it is dispensed to the mixing chamber 207.

In specific embodiments of the invention, the pneumatic system 250 is used to move the intermediate mixture through the mixing area. The pneumatic system can force air into the mixing area via the inlet line 206. The forced air can be used to move the intermediate mixture through the mixing area, to move the intermediate mixture out of the mixing area to the mixing chamber, to agitate the intermediate mixture, etc.

As described before in this disclosure, the intermediate mixture can be further mixed with other substances in the mixing chamber 207 and/or be dispensed out of the device 100. The device can be programmed to dispense the fluid mixture automatically when a mixing cycle is complete, for example by automatically unlocking an outlet of the mixing chamber. In specific embodiments of the invention, the device can be programmed to dispense the fluid mixture when a vessel is sensed. The vessel can be a dedicated vessel such as a vessel with an RFID chip so that the device can sense it or be a common vessel that the device can recognize via a sensor such as a presence sensor in a cup area, or other means. In specific embodiments of the invention, the device can be programmed to dispense the fluid mixture when the device receives an input to do so, such as a user input via user interface 103 or other input.

As a result of the process described above for a mixing cycle conducted by the device to dispense a fluid mixture, substance residues can remain in the mixing area and other fluid channels described above. These substance residues can be a source of contamination for the device, as they can contribute to bacteria proliferation and other undesirable conditions. Additionally, these substance residues can cross contaminate other fluid mixture subsequently prepared by the device, for example fluid mixtures which do not comprise the same substance as the fluid mixture previously prepared. Furthermore, in the long term, these substance residues can cause damage to the device as residue builds up in the channels. Therefore, in specific embodiments of the invention, the device can be programmed to execute a cleaning cycle.

The cleaning cycle can include similar steps as the mixing cycle disclosed above in that one or more substances can be dispensed through the mixing channels and to the mixing area, but with the purpose of cleaning such channels and mixing area. In specific embodiments of the invention, during the cleaning cycle, the one or more substance and/or the intermediate mixture described above for the mixing cycle can be a cleaning fluid for the device. The substance(s) can be dispensed from the reservoir(s) to the mixing area and moved through and out of the mixing area in a similar manner as described for the cleaning cycle, for example using the forced air of the pneumatic system 250. In specific embodiments of the invention, the cleaning cycle can include forcing a blast of air from the pneumatic system into the mixing area to remove any left-overs and clean the mixing area. In specific embodiments of the invention, the cleaning cycle can involve dispensing a cleaning fluid from the device, providing instructions to a user to add the cleaning fluid to a solvent reservoir, and dispensing the cleaning fluid from the solvent reservoir to clean elements of the system that are downstream of the reservoir, but that are otherwise upstream from where the cleaning fluid originated within the system.

As described above, the mixing cycle and the cleaning cycle of the device can have common steps and involve the use of common substances. However, the two cycles can be different in some ways such as in the concentration of the substance used during the mixing cycle and the concentration of the same substance used during the cleaning cycle.

Figure 3:
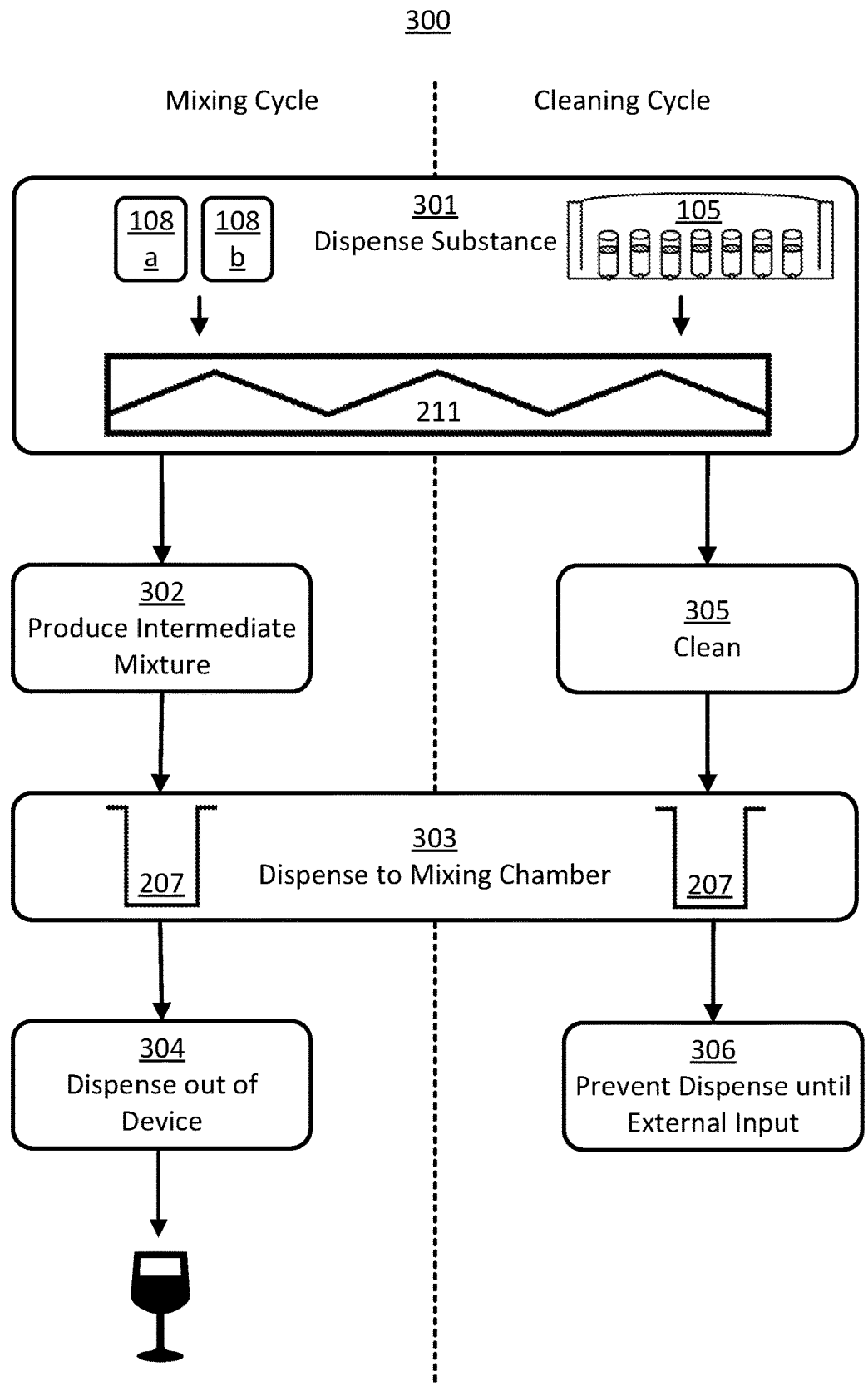
FIG. 3 illustrates a first flowchart for a set of methods for a fluid mixture dispensing system, in accordance with specific embodiments disclosed herein.

FIG. 3 includes a flowchart 300 for a set of methods for the fluid mixture dispensing system that includes the two cycles: the mixing cycle to the left and the cleaning cycle to the right. Flowchart 300 starts with a step 301 of dispensing a substance. As illustrated, the substance can include a solvent, such as a solvent from a solvent reservoir 108*a/b*, or an ingredient from an ingredient reservoir in cartridge 105. Step 301 can be performed for any of the cleaning cycle and the mixing cycle, with similarities and differences for each cycle as will be described below.

Step 301 can be similar for both cycles in that at least one common substance can be dispensed in both cycles. Step 301 can also be similar for both cycles in that the at least one common substance can be dispensed in both cycles in the same way (i.e., from the same reservoir, through the same channels and valves), as explained before in this disclosure. However, the amount or concentration of such substance is not necessarily the same for each cycle. For example, during the mixing cycle the substance can be dispensed in an ingestible amount or concentration, so that the concentration of the substance in the finished fluid mixture is acceptable for an ingestible fluid mixture. However, during the cleaning cycle, the same substance can be dispensed in a larger amount to be used as, or to form, a cleaning fluid. A practical non-limiting example of this implementation is in a case where the substance is a food grade acid. The acid can be dispensed in step 301 during a mixing cycle in an amount equal to approximately 0.08 mg to create a fluid mixture which can be, for example, a wine. During the cleaning cycle, however, the food grade acid can be dispensed in a higher concentration, such as 10 mg or more to produce a cleaning fluid.

In specific embodiments of the invention, the amount of substance of the mixing cycle can be modified based on a requirement for the fluid mixture. For example, the controller can have access to a recipe for the fluid mixture which states the amount of substance, or the controller can receive user preferences regarding the amount of substance. In this way, if the device is configured to prepare a plurality of different fluid mixtures, the amount of substance can vary for each mixing cycle (e.g., some fluid mixtures may be alcoholic recipes while others may not comprise any alcohol, or some recipes may require more acid than others, etc.). However, the amount of substance for the cleaning cycle can be a fixed amount or the given cleaning cycle regardless of the fluid mixtures prepared by the device. For example, a fixed amount of alcohol can be used to sanitize the mixing area. This amount can change depending on a cleaning mode, for example a fixed amount of alcohol may be needed for a deep cleaning mode, and a different, fixed amount of alcohol may be needed for a lighter mode. In specific embodiments of the invention, different modes of the cleaning cycle can require different amounts of at least one common substance.

In specific embodiments of the invention, the substance can be dispensed in the same amount for both cycles. In specific embodiments of the invention, the substance is dispensed in the same or different amount for each cycle and diluted differently for each cycle so that the substance concentration is not the same. In the previous example of the alcohol, this step could include diluting the alcohol with, for example, water, to a concentration of, for example 10-15% to create the wine during the mixing cycle, and not diluting the alcohol at all, or diluting the alcohol to a lesser degree, for the cleaning cycle. If the substance is a solvent, such as in the case of an alcohol, dilution can occur, for example, in a dissolution chamber and/or in a mixed solvent line such as mixed solvent line 206 in FIG. 2. If the substance is an ingredient from an ingredient reservoir, dissolution can occur, for example, in a dissolution chamber and/or in one or mixing channels in the mixing area 211.

Step 301 can differ for each cycle also in that one or more additional substances which are not necessarily common to both cycles can be dispensed individually during each cycle in addition to the at least one common substance. In the example of the alcohol above, step 301 for the mixing cycle could include also dispensing a flavor or colorant for the wine, along with other ingredients. The cleaning cycle, however, could use pure alcohol, or step 301 could include the dispensing of other substance such as water to create a cleaning fluid.

For the mixing cycle, flowchart 300 continues with a step 302 of producing an intermediate mixture. As explained before in this disclosure this step can include the process of the ingredients and/or solvents (including the substance) being dispensed to and coming together in, the mixing area. Step 302 can include the pneumatic system moving the ingredients and/or solvents through the mixing area as also explained before in this disclosure. Step 302 can be followed by a step 303 of dispensing the intermediate mixture out of the mixing area and to the mixing chamber, such as mixing chamber 207 for finalizing the fluid mixture. Step 303 can be performed by using the forced air of the pneumatic system to move the intermediate mixture out of the mixing area. Step 303 can be followed by a step 304 of dispensing the fluid mixture out of the device. Step 304 can be performed automatically, once the mixing cycle is complete, or can be performed in response to an external input. The external input can be a command from a user such as by pressing a button via the interface 103, or the presence of a vessel placed in the outlet of the mixing chamber, as sensed by a sensor of the device, etc. In specific embodiments of the invention the device can be configured to operate with a dedicated vessel, for example a vessel that comprises an RFID tag that the device can recognize. In those embodiments, the device can be programed to conduct step 304 when the dedicated vessel is sensed.

For the cleaning cycle, on the other hand, flowchart 300 continues with a step 305 of cleaning the mixing area. Various exemplary implementations of step 305 will be explained with reference to FIG. 4. In any case, this step includes the use of the substance either pure or combined with other substances as a cleaning fluid to sanitize the mixing area. Step 305 is followed by step 303 of dispensing the cleaning fluid out of the mixing area and to the mixing chamber 207. As illustrated, step 303 can be the same for both the mixing cycle and the cleaning cycle, in that it can be conducted in the same way. The forced air of the pneumatic system can be used during the cleaning cycle to move the cleaning fluid out of the mixing area in the same way as it was explained for moving the intermediate mixture in the mixing cycle. Step 303 is followed by a step 306 of preventing dispense out of the device until an external input is detected. Various exemplary implementations of step 306 will be explained with reference to FIG. 5.

In specific embodiments of the invention, step 303 during the cleaning cycle could be followed by automatically dispensing the cleaning fluid out of the device, as explained for the mixing cycle. However, preventing dispense of the cleaning fluid can be advantageous for various reasons. For example, the cleaning fluid may not be an ingestible fluid. The cleaning fluid can include substances in a concentration which is not to be ingested. Furthermore, the cleaning fluid that is dispensed to the mixing chamber can be waste fluid after having been used to clean or sanitize the mixing area. Dispensing such cleaning fluid automatically out of the mixing chamber could result in a user inadvertently ingesting such fluid as if it were an ingestible beverage. In this sense, it can be advantageous to provide indications to the user that the content of the mixing chamber is not to be ingested, and, in some embodiments, wait for an input from the user to proceed with dispense.

Figure 4:
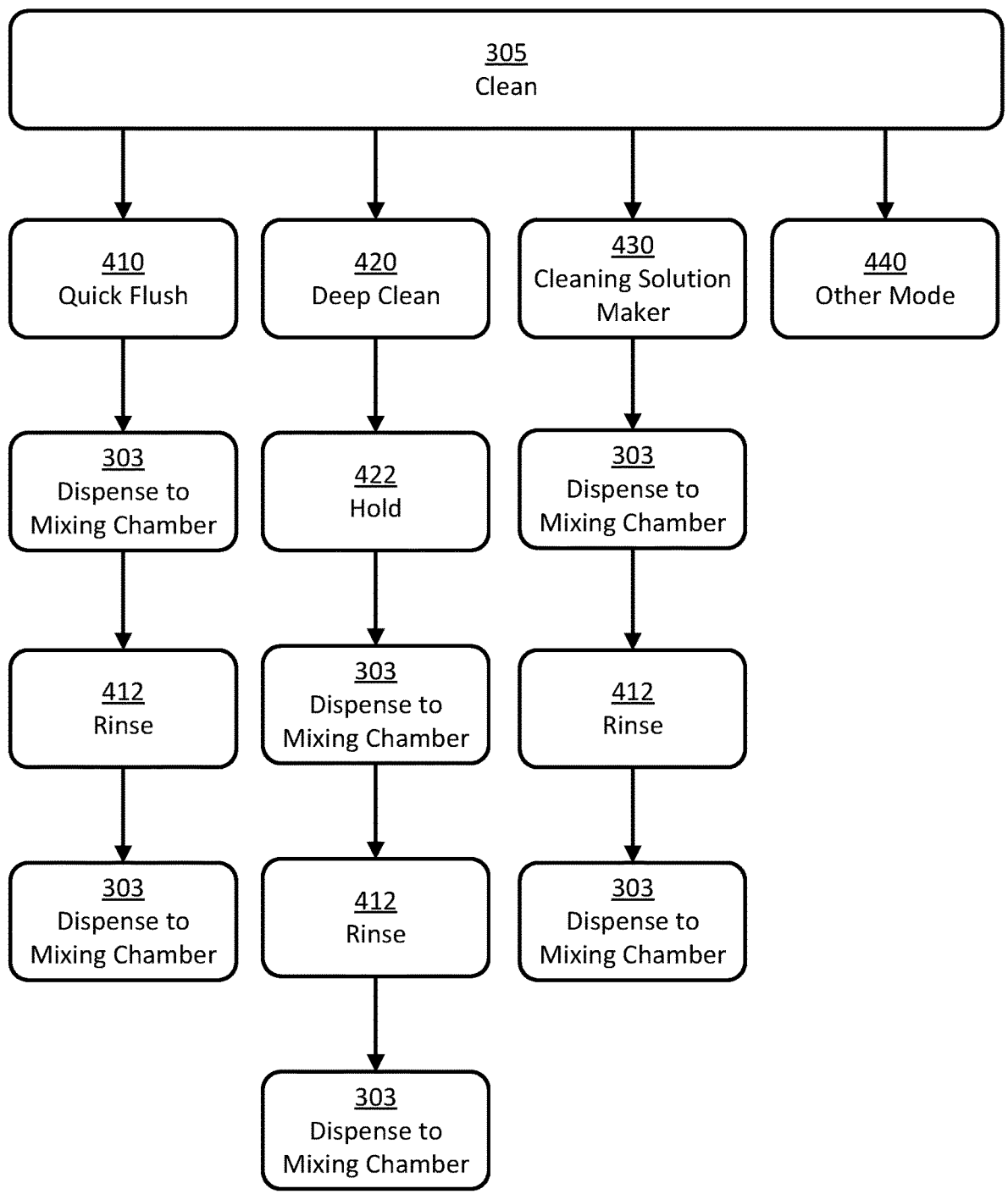
FIG. 4 illustrates a second flowchart for the set of methods for a fluid mixture dispensing system, in accordance with specific embodiments disclosed herein.

FIG. 4 includes a flowchart 400 for a set of methods for a cleaning cycle of the fluid mixture dispensing device. Flowchart 300 includes specific implementations of step 305 of cleaning the mixing area, introduced with reference to FIG. 3. The cleaning cycle can include various modes. The modes can be stored in a memory accessible to the controller in the form of instructions to execute the different cleaning cycles, and/or be adjusted dynamically as will be described below in more detail. The modes can include a quick flush mode, as indicated by step 410, a deep cleaning mode, as indicated by step 420, a cleaning solution maker mode, as indicated by step 430, or other modes, as indicated by step 440. The modes can be selected by a user of the device, for example via the user interface 103. The modes can be performed automatically by the device depending on various factors such as the device configuration, time passed since last cleaning cycle, status of the mixing area (e.g., a contaminant detected) as sensed by sensors in the device, etc. In specific embodiments of the invention, the device can have a default mode and switch to a different mode occasionally, whether automatically or by receiving a user input.

The quick flush mode indicated by step 410 can include flushing the mixing area with the cleaning fluid. This step can include a flush of water or any substance to clean the mixing area. As another example, this step can include a flush of high concentration alcohol to sanitize the mixing area. This quick flush can be performed in between fluid mixtures as a fast way to prevent cross contamination between fluid mixtures. In specific embodiments of the invention, the quick flush mode can be a default mode of the device. In specific embodiments of the invention, the quick flush cleaning cycle can be performed automatically after every mixing cycle. Step 410 can be followed by step 303, introduced in FIG. 3, of dispensing the cleaning fluid or waste out of the mixing area and to the mixing chamber. The quick flush mode can optionally include a step 412 of rinsing the mixing area. This step can include flushing the mixing area with water to rinse any leftover cleaning fluid. This step can include forcing air into the mixing area to rinse any leftover of cleaning fluid. Step 412 can likewise be followed by step 303 of dispensing the waste fluid to the mixing chamber.

The deep cleaning mode indicated by step 420 can include leaving the cleaning fluid in the mixing area for a period of time, for example to sanitize the mixing area. In this way, this mode can include a step 422 of holding for a period of time before dispensing the cleaning fluid out to the mixing chamber in step 303. The deep cleaning mode can also optionally include a step 412 of rinsing the mixing area. This step can be the same as described for the quick flush mode and likewise be followed by step 303 of dispensing any waste fluid to the mixing chamber.

The cleaning solution maker mode indicated by step 430 can include generating a cleaning product. The cleaning product can be generated using a combination of one or more substances. For example, the cleaning product can comprise at least one ingredient from ingredient reservoirs 106 and at least one solvent from solvent reservoirs 108*a/b*. This cleaning product can be used for any purpose such as for cleaning areas external to the device. The cleaning product can be synthesized by mixing the substance with one or more other substance. In specific embodiments of the invention, in which the device can output solid mixtures, the cleaning solution could be a tablet. This mode can be followed by the step 303 of dispensing the cleaning solution out of the mixing area. This step can also include a rinsing step 412 and a step 303 for dispensing any waste to the mixing area as explained before for the other modes.

Other cleaning cycle modes can be implemented as indicated by step 440. For example, a user can be able to configure a cleaning mode based on the time that the user has available for cleaning the device, based on the substances that the user wants or does not want to use, etc. Other modes may also involve adjusting the temperature of the cleaning fluid to perform the cleaning cycle, the concentration of substance, the amount of cleaning fluid, or others.

As illustrated, the cleaning cycle modes in FIG. 3 have a common final step 303 of dispensing (either cleaning fluid, waste, or cleaning product) to the mixing chamber. As explained with reference to FIG. 3, this step can be followed by a step 306 of preventing dispense until an external input is received.

Figure 5:
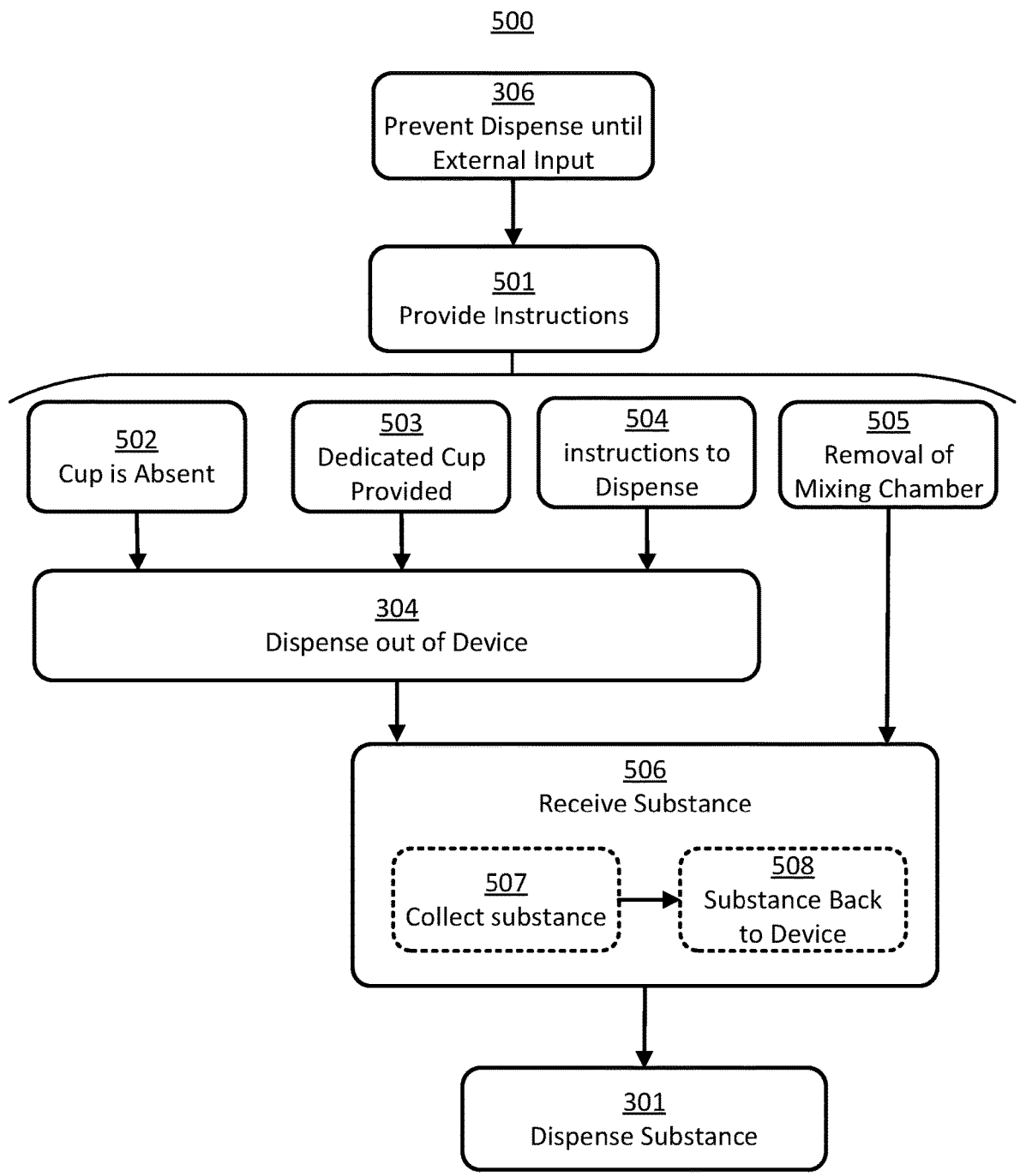
FIG. 5 illustrates a third flowchart for the set of methods for a fluid mixture dispensing system, in accordance with specific embodiments disclosed herein.

FIG. 5 illustrates a flowchart 500 for a set of methods for a fluid mixture dispensing device, including examples of external inputs that can be received from step 306. The external input can include detecting that a cup is absent from a cup area, as indicated by step 502. This step can be performed using a sensor in a cup area of the device. In specific embodiments of the invention, this step can be advantageous in that it can be guaranteed that the cleaning fluid will not be dispensed into a cup that could potentially be used by a user to ingest the fluid. This step can then be followed by step 304, introduced with reference to FIG. 3, of dispensing the cleaning fluid out of the device. The cleaning fluid can be dispensed, for example, to a waste area of the device, such as a drain of the cup area, drip tray or similar structure.

The external input can also, or alternatively, include detecting the presence of a dedicated container in the cup area of the device, as indicated by step 503. In specific embodiments of the invention, the dedicated container can be a container with an RFID tag that the device can recognize as a cleaning fluid container. In specific embodiments of the invention, the dedicated container can be a reservoir of the device, such as solvent reservoirs 108*a/b*. In those embodiments, the cleaning fluid can be returned back to the device in the reservoir, as will be explained in more detail below. In these embodiments the device can be configured to not dispense the cleaning fluid until the specific cleaning fluid container is provided in the final dispense area.

The external input can also, or alternatively, include receiving instructions to dispense the cleaning fluid, as indicated by step 504. The instructions can be received from a user of the device and indicate that the user is aware that a cleaning fluid is going to be dispensed, and not an ingestible fluid mixture. The instructions can be received via user interface 103, a mobile device working in association with the device, or other means.

The external input can also, or alternatively, include manual removal of the mixing chamber, as indicated by step 505. This step can be performed by a user of the device to manually collect the cleaning fluid. Multiple other external inputs are possible, and the examples given should not limit the scope of this invention. Any action that indicates to the system that there is no risk for dispensing the cleaning fluid out of the mixing chamber can be used as an external input.

In specific embodiments of the invention, the system can be configured to provide instructions to the user for any of the inputs disclosed before, as indicated by step 501. Those instructions can be related to the external input that the system is expecting to receive. Those instructions can provide indications to the user as to what action needs to be taken for the cleaning fluid to be dispensed out of the mixing chamber. For example, the instructions can include instructions to remove a cup from the mixing area. Those instructions can be given before proceeding, for example, with step 502. Other instructions can include instructions to place a dedicated cup for the cleaning fluid in the cup area. Those instructions can be given before proceeding, for example, with step 503. Other instructions can include instructions to instruct the user to perform an action to instruct the dispense, for example pressing a "dispense cleaning fluid now" bottom or other input that indicates that the user is aware that the cleaning fluid will be dispensed next. Those instructions can be given before proceeding, for example, with step 504. Other instructions can include instructions to remove the mixing chamber, such as instructions on how to remove it. Those instructions can be given before proceeding, for example, with step 505. These and other instructions can be provided alone or in combination in step 501 and at different points during the cycle. In this way, the user can receive information and/or instructions on the status of the cycle and next steps to be taken throughout the process.

In specific embodiments of the invention, and as illustrated by step 506, the cleaning fluid can be received back to the device 100. This step can involve a user collecting the cleaning fluid dispensed in steps 304 and 305, as indicated by sub-step 507, and providing the cleaning fluid to the device, as indicated by sub-step 508. The cleaning fluid can be provided to the device by pouring the cleaning fluid into a reservoir of the device. In specific embodiments of the invention, the reservoir can be one of the solvent reservoirs and/or ingredient reservoirs disclosed herein. If the cleaning fluid was collected in a dedicated container as explained before with reference to step 503, step 506 can include placing the content of the dedicated reservoir into the device. In specific embodiments of the invention, the device can have a dedicated interface and/or input for the dedicated container. In specific embodiments of the invention and as also explained with reference to step 503, the dedicated container can be reservoir of the device, such as a solvent reservoir 108a/b. In such case, step 506 could include placing the solvent reservoir back to its original position in the device.

Flowchart 500 ends with the optional step of dispensing the cleaning fluid, which can be the same step 301 of dispensing the substance in flowchart 300. This step could continue a cleaning cycle by dispensing the cleaning fluid from a device reservoir (as explained with reference to FIG. 3 for both the mixing cycle and the cleaning cycle), and therefore cleaning all the fluid lines from the reservoir and to the mixing area. In specific embodiments of the invention, this step can be advantageous in that a cleaning fluid could not only clean the mixing channels in the mixing area where the cleaning fluid is dispensed/formed, but also other upstream channels in which the cleaning fluid would otherwise not pass through.

Although the example of an alcohol as a substance that can unfold as both an ingredient of a fluid mixture during a mixing cycle and a component of a cleaning fluid was given throughout this disclosure, this is not a limitation of the present invention. Other substances can be used in the systems and methods used herein. The substances can be substances that can be ingested and also used to create a cleaning fluid. For example, a food grade acid, such as citric acid, could be used during both a mixing cycle for a beverage and a cleaning cycle for a cleaning fluid. In the same way, different salts can be used for both purposes.

| Ingredient | Mixing Cycle Possible Concentration | Cleaning Cycle Possible Concentration |
|---|---|---|
| Alcohol | 10-15% ABV for wine | 80% ABV to sanitize |
| Citric Acid | 0.1% | 0.6% |
| Lactic Acid | 0.00001% | 3% |

A controller, as used in this disclosure for example with reference to controller 210, can include one or more processors that can be distributed locally within the system or remotely. For example, one or more components of the system, such as valves, pumps, and sensors can be associated to individual microcontrollers that can control their operations and interaction with other components of the system. In specific embodiments of the invention, the controller can be a control system for the overall device even if the various control elements are separately programmed and are not part of a common control hierarchy. The controller can have access to one or more memories that store the instructions for the controllers. The memories can also store information for the system, such as a library of recipes, reference values such as the pressure thresholds and/or target pressure values mentioned in this disclosure, and any other necessary information such as sensor data and the like.

While the specification has been described in detail with respect to specific embodiments of the invention, it will be appreciated that those skilled in the art, upon attaining an understanding of the foregoing, may readily conceive of alterations to, variations of, and equivalents to these embodiments. Any of the method disclosed herein can be executed by a processor in combination with a computer readable media storing instructions for the methods in combination with the other hardware elements described above. These and other modifications and variations to the present invention may be practiced by those skilled in the art, without departing from the scope of the present invention, which is more particularly set forth in the appended claims.

What is claimed is:

1. A fluid mixture dispensing system comprising:
   at least one reservoir for storing a substance;
   a mixing area;
   a mixing chamber fluidly connected to the mixing area; and
   a controller programmed to cause the fluid mixture dispensing system to:
   during a mixing cycle:
      dispense the substance from the at least one reservoir to the mixing area to prepare an ingestible fluid mixture;
      move the ingestible fluid mixture to the mixing chamber; and
      dispense the ingestible fluid mixture out of the mixing chamber automatically; and
   during a cleaning cycle:
      dispense the substance from the at least one reservoir to the mixing area to sanitize the mixing area;
      move the substance to the mixing chamber; and
      prevent dispensing of the substance out of the mixing chamber until an external input is detected.

2. The fluid mixture dispensing system of claim 1, wherein:
   the substance is alcohol; and
   the controller is further programmed to cause the fluid mixture dispensing system to:
   dispense another substance to dilute the alcohol and prepare the ingestible fluid mixture during the mixing cycle; and
   dispense the alcohol in a concentration that is 80-100% alcohol by volume during the cleaning cycle.

3. The fluid mixture dispensing system of claim 1, wherein the substance is one of: an alcohol, a food grade acid, and a concentrated salt.

4. The fluid mixture dispensing system of claim 1, further comprising:
   a pneumatic system connected to the mixing area and configured to provide forced air to the mixing area;
   wherein the controller is further programed to cause the fluid mixture dispensing system to agitate the substance in the mixing area using the forced air.

5. The fluid mixture dispensing system of claim 1, wherein the controller is programmed to detect the external input by sensing an absence of a vessel in a vessel area.

6. The fluid mixture dispensing system of claim 1, further comprising:
   a user interface;
   wherein the controller is programmed to detect the external input by at least one of:
   detecting an input from the user interface; and
   detecting a manual removal of the mixing chamber.

7. The fluid mixture dispensing system of claim 1, wherein the controller is further programmed to cause the fluid mixture dispensing system to:
   hold, during the cleaning cycle, the substance within the mixing area for a period of time.

8. The fluid mixture dispensing system of claim 7, wherein the period of time is determined at least based on a mode of the cleaning cycle.

9. The fluid mixture dispensing system of claim 1, further comprising:
   a pneumatic system connected to the mixing area;
   wherein the pneumatic system moves the substance through the mixing area during at least part of the mixing cycle and at least part of the cleaning cycle.

10. The fluid mixture dispensing system of claim 9, wherein:
    the pneumatic system moves the substance through the mixing area by forcing air into the mixing area.

11. The fluid mixture dispensing system of claim 10, wherein the controller is further programed to cause the fluid mixture dispensing system to:
    force the substance out of the mixing area using forced air from the pneumatic system.

12. The fluid mixture dispensing system of claim 1, wherein:
    during the mixing cycle, the substance is dispensed in a first amount; and
    during the cleaning cycle, the substance is dispensed in a second amount.

13. The fluid mixture dispensing system of claim 12, wherein:
    the first amount and the second amount are a same amount; and
    the substance is diluted to a concentration for the mixing cycle with is different than a concentration for the cleaning cycle.

14. The fluid mixture dispensing system of claim 12, wherein:
    the fluid mixture dispensing system is configured to prepare a plurality of fluid mixtures;
    the controller is further programed to modify the first amount based on a requirement for each fluid mixture in the plurality of fluid mixtures; and
    the second amount is a fixed amount for each mixture in the plurality of fluid mixtures.

15. The fluid mixture dispensing system of claim 12, wherein the controller is further programmed to:
    determine the first amount based on a requirement for the ingestible fluid mixture; and
    determine the second amount based at least on a mode of the cleaning cycle.

16. The fluid mixture dispensing system of claim 15, wherein:
    the mode of the cleaning cycle comprises: a quick flush mode and a deep cleaning mode; and
    the substance used in the quick flush mode and the deep cleaning mode is a same substance.

17. A fluid mixture dispensing system comprising:
    at least one solvent reservoir;
    at least one ingredient reservoir;
    a mixing area;
    a mixing chamber fluidly connected to the mixing area; and
    a controller programmed to cause the fluid mixture dispensing system to:
    during a mixing cycle:
       dispense a solvent from the at least one solvent reservoir to the mixing area to prepare an ingestible fluid mixture;
       mix, in the mixing area, the solvent from the at least one solvent reservoir and an ingredient from the at least one ingredient reservoir to create an ingestible fluid mixture;
       move the ingestible fluid mixture to the mixing chamber; and
       dispense the ingestible fluid mixture out of the mixing chamber automatically; and
    during a cleaning cycle:
       dispense the solvent from the at least one solvent reservoir to the mixing area to sanitize the mixing area;

generate, in the mixing area, a cleaning product using the solvent from the at least one solvent reservoir and ingredient from the at least one ingredient reservoir;
move the cleaning product to the mixing chamber; and
prevent dispensing of the cleaning product out of the mixing chamber until an external input is detected.

\* \* \* \* \*